3,391,995
METHOD OF PREPARING SATIN WHITE
Karl-Heinz Rosenstock and Bernhard Kowalski, Bielefeld,
 Germany, assignors to Feldmuhle Aktiengesellschaft,
 Dusseldorf, Germany
No Drawing. Filed Nov. 29, 1965, Ser. No. 510,367
Claims priority, application Germany, Dec. 31, 1964,
 F 44,864
7 Claims. (Cl. 23—122)

ABSTRACT OF THE DISCLOSURE

When satin white is prepared from aluminum sulfate solution and quick lime or slaked lime by mixing the lime with only a portion of the necessary aluminum sulfate solution and adding the balance of the aluminum sulfate thereafter to the mixture, a fine grained product is consistently obtained.

---

This invention relates to the preparation of satin white, and particularly to an improvement in the preparation of satin white from aluminum sulfate and quick lime or slaked lime in an aqueous medium.

Satin white is a calcium sulfoaluminate having a composition corresponding to the approximate formula $CaO \cdot Al_2O_3 \cdot 3CaSO_4 \cdot 31H_2O$, and is a valuable white pigment which is used on a large scale in the manufacture of paint, and particularly in the manufacture of coated paper and paperboard. It is commonly prepared by reacting an aqueous dispersion of quick lime or slaked lime with aluminum sulfate in stoichiometrically equivalent amounts corresponding to the above formula.

The quality of the pigment obtained depends on the composition, and may be unsatisfactory if the composition differs significantly from the formula. The reaction conditions, moreover, have a critically important influence on the size and the shape of the pigment particles formed, and such size and shape determine the properties which control the gloss, the smoothness, the whiteness, the hiding power of a coating prepared from satin white in conjunction with other pigments and such binders as casein, protein, or starch. The manner in which the pigment is made also influences the ink retention qualities of a coating made with casein and protein, its resiliency under pressure, and its water resistance.

Satin white when used in paper coating compositions together with other pigments and binders should increase the viscosity of the composition by as little as possible.

Satin white is commonly used and shipped as an aqueous paste containing 20–30 percent solids. If the reaction mixture obtained from aluminum sulfate and lime contains more water, it is necessary to separate the solids together with an adsorbed liquid from the remainder of the reaction mixture by filtering with or without pressure. Yet, operation in a dilute system is preferred because it provides better control of operating conditions. When the water present amounts to only 70–80% of the ultimate reaction mixture, it is difficult to control the reaction temperature, and the reactants have to be mixed at so slow a rate that the overall reaction time required becomes very long.

While the influence of certain process variables on the quality of the satin white produced is vaguely known, there is no clear understanding of the process mechanism which would permit precise control over the conventional process, and empirical knowledge gained over an extended period of time is considered necessary for producing a reasonably consistent satin white pigment.

One of the few rules of satin white making which are commonly known and were generally accepted prior to this invention warns against adding the lime to the aluminum sulfate. Aluminum sulfate, according to the best available authorities, must always be added to the lime suspension if a useful satin white is to be produced (see TAPPI Monograph No. 20 "Paper Coating Pigments," page 139; also "Die Buntpapierfabrikation" by Weichelt, page 131).

It has now been found that satin white of the highest quality can be produced consistently by admixing the lime (quick lime or slaked lime) to an aqueous solution containing aluminum sulfate in an amount substantially smaller than the equivalent of the lime, and by thereafter adding the remainder of the aluminum sulfate equivalent to the excess of the lime. The satin white obtained consists of very small crystals having an open structure. The properties of the pigment can be varied in a reproducible manner by modifying certain process variables as will presently become apparent. The pigment having the highest hiding power is obtained by the use of very dilute aluminum sulfate solutions.

The amount of aluminum sulfate first mixed with the lime, hereinafter referred to as "primary aluminum sulfate," should be between 30 and 90 percent of the lime equivalent according to the above formula of satin white, but best results are obtained with an amount of primary aluminum sulfate between 40 and 60 percent of lime equivalent.

The primary aluminum sulfate solution preferably contains only a small fraction of the aluminum sulfate soluble in the aqueous medium. The specific gravity of the aluminum sulfate solution should be between 1 and 10° Bé., preferably between 1.5 and 5° Bé., with best results being obtained between 1.5 and 3 degrees Beaumé. The temperature of a reaction mixture containing the large amounts of water inherent in such a dilute aluminum sulfate solution does not vary significantly during the reaction, and this practically constant temperature during the reaction period is believed to contribute materially to the results obtained.

When lime and aluminum sulfate are mixed in amounts corresponding to the known formula of satin white in an aqueous medium, and the pH of the mixture is measured from time to time, it is found that the pH ultimately reaches a value of 11.2 to 11.6 when the solid material present has the composition corresponding to the formula. It has now been found that the solids may safely be separated from most of the liquid remainder of the reaction mixture when the pH of the aqueous medium reaches a value of 10.6 to 10.8. The reaction goes to completion in the moist solids obtained by filtration so that the ultimate product has the desired pH of 11.2 to 11.6.

Whereas high dilution of the primary aluminum sulfate solution has a distinct favorable influence on the particle size and particle shape of the pigment produced, it has been found that the amount of water introduced into the reaction system with the lime is practically irrelevant. It is therefore most advantageous to admix substantially solid quick lime or slaked lime to the primary aluminum sulfate solution, thereby increasing the production capacity of available reaction vessels.

The formation of fine crystals having the desired open structure is favored by agitation of the reaction mixture. High speed mixers whose rotary stirrers move at a circumferential velocity of at least 700 meters per minute are effective in preventing the formation of coarse crystal aggregates.

It is one of the major advantages of this invention that the properties of the satin white produced can be controlled in a simple and reproducible manner to suit the ultimate use of the pigment by merely varying the proportions of primary and secondary aluminum sulfate.

Whereas conventional methods of preparing satin white do not yield a satisfactory product unless aluminum sulfate of very high purity and high basicity is employed as a starting material, ordinary papermaker's alum of the quality commonly used for sizing stock is entirely satisfactory. Variations in basicity of the aluminum sulfate affect the results obtained by the method of the invention to a much smaller extent than those of the conventional process.

The attached table shows process conditions used, and results obtained in five runs of the process of the invention.

In each run one mole of solid hydrated lime was added to a constant volume of primary aqueous aluminum sulfate solution in a reaction vessel equipped with a high-speed stirrer of the afore-described type, so that the lime gradually reacted with the aluminum sulfate. The aluminum sulfate solutions differed in their concentrations, and this accounts for the tabulated differences in "moles primary aluminum sulfate." After all the lime had been added, secondary aluminum sulfate solution was added in an amount equivalent to the excess of lime over the primary aluminum sulfate.

When the reaction mixture reached a pH of 10.8, its viscosity was measured with a Brookfield viscosimeter at at 50 r.p.m. The suspension contained 2.7% satin white (by weight on an oven-dry basis, 105° C.). The satin white precipitate was separated from most of the liquid by filtration, stored a few hours until its pH reached approximately 11.4, and suspended in a fixed amount of a 12 percent casein solution. The viscosity of the coating composition so obtained was then determined with the Brookfield viscosimeter at 100 r.p.m., and raw paper was coated with each composition to a coating weight of 20 grams per square meter.

The coated papers were conditioned at 55 percent relative humidity, and were passed over a super calender under standard conditions. The gloss of the coated paper obtained was evaluated visually and with a Varispec gloss meter. The gloss values determined by means of the instrument are considered somewhat less reliable than the results of visual inspection because the gloss values were near the limits of the useful measuring range of the instrument.

It is evident from the tabulated values that the quality of the satin white produced is uniquely related to the manner in which the total amount of aluminum sulfate employed is divided between the primary and secondary aluminum sulfate portions. The aqueous satin white suspensions initially obtained by the process of the invention and coating compositions prepared therefrom reach their highest viscosities when the lime is mixed initially with about one half of the total alumnum sulfate stoichiometrically required. Inspection of the several batches of satin white produced in the five runs under an electron microscope has shown that the particles of satin white obtained under such conditions are crystals of the smallest obtained size and having the loosest structure.

When the process conditions are selected for high viscosity of the reaction mixture, the coating composition made from the satin white has highest gloss, smoothness, hiding power, and excellent ink retention and water resistance. The viscosity of the coating composition is still within tolerable limits.

If the satin white is intended for use in coating compositions of high solids content, based on casein or protein binders and preferably having high water resistance, the amount of primary aluminum sulfate solution is selected for low ultimate viscosity of the reaction mixture.

Equivlent amounts of quick lime, when substituted for the slaked lime of the afore-described five runs, gave substantially identical results. The concentrations of the secondary aluminum sulfate solutions were selected in the examples to yield uniform ultimate volumes, and thus closely comparable conditions in the several runs, but the concentration of the secondary aluminum sulfate solutions is not of primary importance.

No attempt was made to control the temperature in the runs described above. All runs were started at ambient temperature, and the heat of the reaction did not materially change the temperature of the reaction mixture, as is inherent in the large amount of water present. No advantages are gained by refrigeration or by heating, and operation in the usual ambient temperature range of 15 to 30° C. is therefore preferred. The reaction, however, is affected by the ratio of primary to secondary aluminum sulfate in the manner described above regardless of the reaction temperature.

While the invention has been described with particular reference to specific embodiments, it is to be understood that it is not limited thereto, but is to be construed broadly and restricted solely by the scope of the appended claims.

TABLE

| Run No. | 1 | 2 | 3 | 4 | 5 |
|---|---|---|---|---|---|
| Mols primary Al sulfate | 0.027 | 0.053 | 0.080 | 0.107 | 0.133 |
| Mols secondary Al sulfate | 0.133 | 0.107 | 0.080 | 0.053 | 0.027 |
| Conc'n of prim. Al sulfate solution, ° Bé | 1.0 | 1.4 | 2.0 | 2.6 | 3.0 |
| Conc'n of sec. Al sulfate solution, ° Bé | 3.0 | 2.6 | 2.0 | 1.4 | 1.0 |
| Viscosity, cp., of aqueous satin white suspension | 480 | 880 | 1,600 | 900 | 224 |
| Viscosity, cp., of coating composition | 32 | 41 | 101 | 68 | 62 |
| Gloss, visual | (1) | (2) | (3) | (2) | (4) |
| Gloss, Vaispec | 52 | 55 | 58 | 55 | 52 |

[1] Poor.
[2] Good.
[3] Very good.
[4] Adequate.

What is claimed is:

1. A method of preparing satin white having the approximate formula $3CaO \cdot Al_2O_3 \cdot 3CaSO_4 \cdot 31H_2O$ from stoichiometrically equivalent amounts of aluminum sulfate and quick lime or slaked lime corresponding to said formula which comprises:
   (a) admixing a predetermined amount of said quick lime or slaked lime to an aqueous solution of primary aluminum sulfate with agitation; said primary aluminum sulfate being between 30 and 90 percent of the stoichiometric equivalent of said lime; and
   (b) adding to the mixture so obtained an amount of secondary aluminum sulfate stoichiometrically equivalent to the excess of said quick lime or slaked lime over said primary aluminum sulfate with agitation, whereby satin white is formed as a solid phase.

2. A method as set forth in claim 1, wherein said primary aluminum sulfate is between 40 and 60 percent of the stoichiometric equivalent of said quick lime or slaked lime.

3. A method as set forth in claim 1, wherein the specific gravity of said aqueous solution is between 1 and 10 degrees Beaumé.

4. A method as set forth in claim 1, wherein the specific gravity of said aqueous solution is between 1.5 and 5 degrees Beaumé.

5. A method as set forth in claim 1, wherein said quick lime or slaked lime is in the solid state when being admixed to said solution.

6. A method as set forth in claim 1, wherein said solid phase is separated from the aqueous remainder of said mixture when the pH of said remainder is between 10.6 and 10.8.

7. A method as set forth in claim 1, wherein said aqueous solution is agitated during said admixing of the quick lime or slaked lime by contact with a stirrer moving at a velocity of at least 700 meters per minute.

References Cited

UNITED STATES PATENTS

| | | | |
|---|---|---|---|
| 1,934,640 | 11/1933 | Rafton | 23—123 X |
| 2,145,149 | 1/1939 | Work | 106—306 |
| 2,435,600 | 2/1948 | Rafton | 106—306 |

OTHER REFERENCES

Belcher, V. A., Pigments for Paper Coating, pp. 88–94, Technical Association of the Pulp and Paper Industry, New York, 1948.

OSCAR R. VERTIZ, *Primary Examiner.*

G. PETERS, *Assistant Examiner.*